April 2, 1940.  D. M. SMITH  2,195,501
ROTARY SWIVEL
Filed Feb. 23, 1937  2 Sheets-Sheet 1
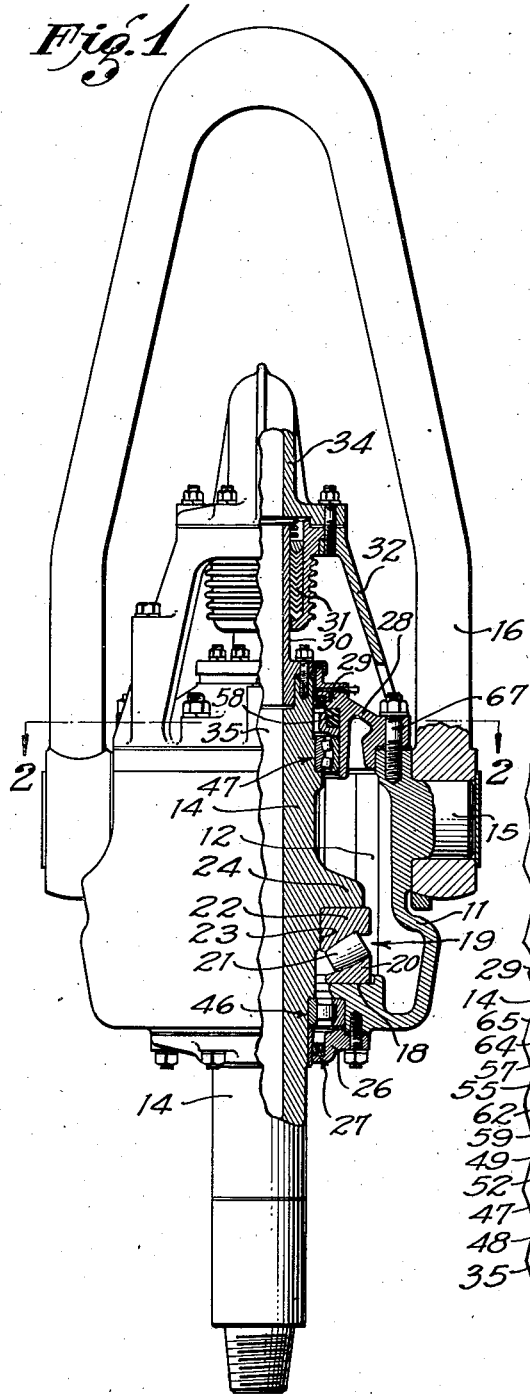
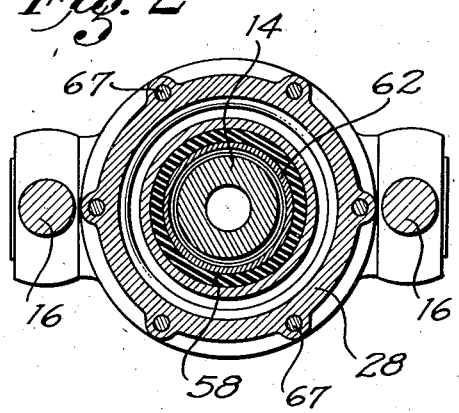
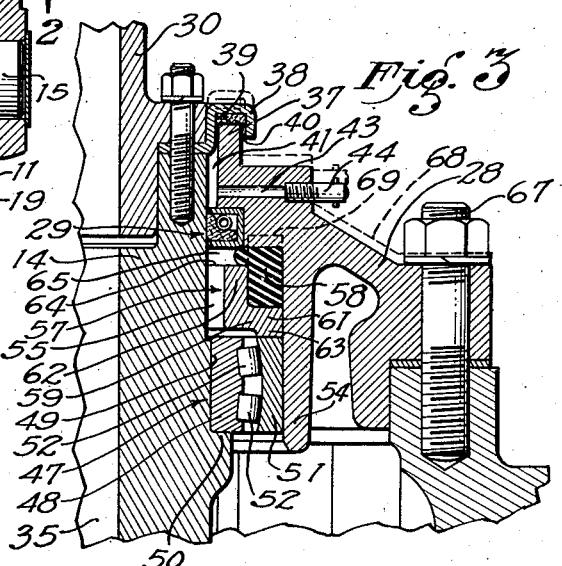
DAVID M. SMITH,
INVENTOR.
BY
ATTORNEY April 2, 1940.　　　D. M. SMITH　　　2,195,501
ROTARY SWIVEL
Filed Feb. 23, 1937　　　2 Sheets-Sheet 2
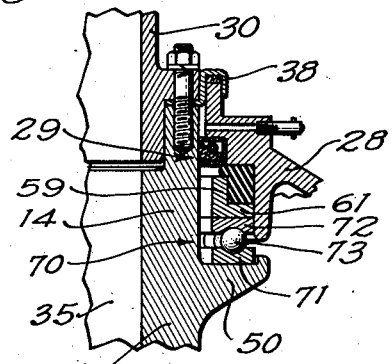
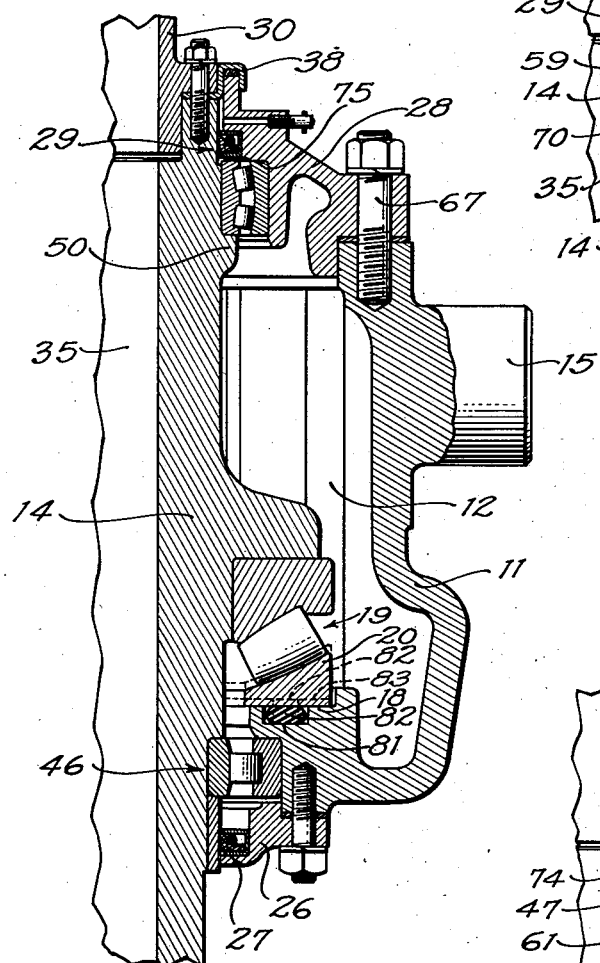
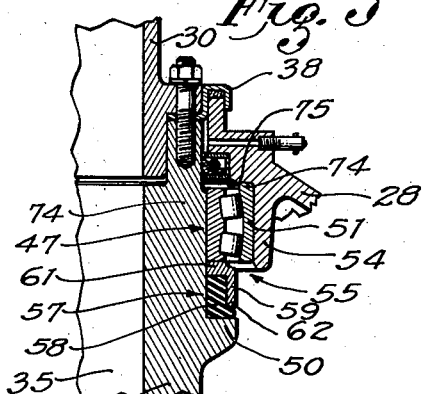
DAVID M. SMITH,
INVENTOR.
BY
ATTORNEY Patented Apr. 2, 1940

2,195,501

UNITED STATES PATENT OFFICE 2,195,501

ROTARY SWIVEL

David M. Smith, Hermosa Beach, Calif., assignor to Emsco Derrick & Equipment Company, Los Angeles, Calif., a corporation of California Application February 23, 1937, Serial No. 126,997

4 Claims. (Cl. 308—227)

My invention relates to oil well drilling equipment and more particularly to a rotary swivel.

In the oil well drilling industry a rotary swivel is used as a connecting means between the upper end of the rotatable drill pipe and the non-rotatable traveling block. The body of the swivel is nonrotatable, being supported by the traveling block, while the spindle of the swivel is rotatably supported within the body by suitable bearings, the spindle being connected to the drill pipe which is in turn rotated by a rotary table supported on the derrick floor. This drill pipe extends into the well to the bottom thereof and has a bit secured to it whereby the drilling operation is performed.

The spindle of the swivel is supported by a thrust bearing and one or more radial bearings, the latter being employed for maintaining the spindle in a concentric axial position and is intended to restrain the parts from misalignment which obviously would cause undue wear on the different swivel parts.

The thrust bearing, on the other hand, is called upon to carry the load of the drill pipe and is in the deeper wells called upon to carry enormous loads which may be as great as three hundred tons, and therefore must not only be of great mechanical strength, but must also be accurately aligned in order that the races and bearing members will not be subjected to improper wear and in order that improper wear will not be placed on other parts due to misalignment.

It is an object of my invention to provide a rotary swivel in which the various parts, and particularly the thrust bearing, are maintained in accurate alignment when once assembled.

It is a further object of my invention to provide a simple and effective means for retaining the thrust bearing in proper operating positions at all times.

It is also an object of my invention to provide a rotary swivel in which the thrust bearing parts are resiliently or yieldably retained, under a substantial pressure, in proper operating positions.

It is a still further object of my invention to provide a rotary swivel in which the spindle is yieldably restrained from longitudinal movement and yieldably held against the thrust bearing.

It is common practice to employ a hold-down bearing between the spindle and swivel body, and it is the intention, in so providing this bearing, to adjust the parts so that longitudinal movement of the spindle relative to the body will not occur, and to receive any upthrust applied to the spindle. It is very difficult, if not impossible, to adjust the parts so that the hold-down bearing restrains the spindle from longitudinal play because of the tolerances necessary in the machining of the parts, and the result is that the adjustment is made slightly loose rather than too tight, since the latter type of adjustment would result in a binding action and undue wear on the parts.

It is an object of my invention to cure the difficulty referred to in the above paragraph by the provision of a rotary swivel in which the hold-down bearing is yieldably supported in a position so that it will at all times restrain end play of the spindle and so that there will be no binding on any of the parts.

It is a still further object of my invention to provide a rotary swivel in which upthrusts transmitted through the spindle are absorbed by a shock absorbing means.

A still further object of my invention is to provide a rotary swivel in which the spindle is restrained from end play by means which operates to compensate for changes in sizes of parts, such as may be caused by wear or expansion and contraction due to temperature changes.

A still further object of my invention is to provide a rotary swivel in which the thrust bearing always operates under a substantial minimum load.

It is another object of my invention to provide a rotary swivel of the character referred to in the preceding paragraph in which the hold-down bearing also operates under a substantial minimum load.

It is a still further object of my invention to provide a rotary swivel in which the thrust bearing has applied to it at all times, through a medium of a yieldable or resilient pressure applying means, a predetermined minimum operating load.

In addition to the foregoing objects and advantages there are others which accrue from the details of construction and certain arrangement of the parts of my invention. These additional objects and advantages will be made evident during the description of the preferred forms of my invention to be hereinafter described. It is to be understood that the principle of my invention may be embodied in different mechanical forms and that various alterations and modifications of the preferred forms of my invention to be disclosed and described herein may be varied without departing from the spirit and scope of my invention. I therefore wish my invention to be broadly interpreted in accordance with the preceding statement of invention and appended claims, it being understood that the following description of preferred forms of my invention is intended for the purpose of teaching those skilled in the art as to how my invention may be practiced.

Referring to the drawings:

Fig. 1 is an elevational view in quarter section disclosing one form of my invention.

Fig. 2 is a section taken on the line 2—2 of Fig. 1.

Fig. 3 is an enlarged fragmentary elevational view showing the important parts of my invention in detail.

Fig. 4 is an elevational view in quarter section corresponding to Fig. 1 and illustrating an alternative form of my invention.

Fig. 5 is a view corresponding to Fig. 1 and illustrating another form in which my invention may be embodied.

Fig. 6 is a fragmentary sectional view illustrating still another form of my invention.

Referring to the drawings in detail, and particularly to Figs. 1 to 3 inclusive, the numeral 11 represents a swivel body which provides a chamber 12 which is ordinarily filled with lubricant, and through which a spindle 14 is extended. The body 11 is provided with trunnions 15 whereby a suitable bail 16 is connected thereto, this bail 16, when the rotary swivel is in use, being supported by the traveling block of the derrick. The lower part of the body 11 is provided with an annular shoulder 18 which is concentric to the axis of rotation of the spindle 14, and by means of which a thrust bearing 19 is supported. The thrust bearing 19 includes a lower race 20, barrel shaped rollers 21, and an upper race 22. It will be noted that the rollers 21 and the faces which support them extend inwardly and downwardly which provides a self-centralizing action, and the bearing 19 may be referred to as a self-centralizing type of bearing. The upper race 22 is mounted on the spindle 14, being in engagement with a cylindrical face 23 thereof, and the lower face of an annular shoulder 24.

The lower end of the body 11 is provided with a lower cover 26 which carries an oil seal 27, these parts preventing oil leakage from the body around the spindle 14. The upper end of the body 11 is provided with a cover 28 and carries a sealing unit 29 which, in cooperation with other parts to be later described, forms a seal to prevent leakage from the upper part of the chamber 12 around the upper end of the spindle.

Connected to the upper end of the spindle 14 and extending upward therefrom is a wash pipe 30 which extends into a stuffing box 31, which is in turn supported by a bridge member 32, the bridge member 32 being formed integrally with the cover 28. The bridge member 32 carries a gooseneck 34, by means of which rotary mud is supplied to the wash pipe 30 and passed downwardly through a longitudinal passage 35 of the spindle 14 whereby rotary mud is delivered to the drill pipe and to the bit connected to the lower end thereof.

As shown best in Fig. 3, the cover 28 is provided with an upstanding cylindrical wall 37 which is concentric to the axis of rotation of the spindle 14. Secured to the upper end of the spindle 14 is a sealing member which provides an annular channel 38 which is open at its lower part, and into which the annular wall 37 extends. Positioned between the upper end of the wall 37 and the bottom of the channel 38 is a felt ring 39 which closes the bottom of the channel and prevents leakage from the annular space 40 surrounding the wall 37 and the annular space 41 provided within the annular wall 37. Connected to this space 41 is a passage 43, and secured to the cover 28 in communication therewith is a grease nipple 44, by means of which the space 41 may be filled with grease. This grease may be used to lubricate or saturate the felt 39 and also to keep the sealing means 29 properly lubricated.

Lateral movement of the spindle 14 is restrained by a lower radial bearing 46 and an upper radial bearing 47. As shown best in Fig. 3, the upper radial bearing 47 has an inner race 48 which is placed on the spindle 14 in engagement with a cylindrical face 49 and a shoulder 50. The bearing 47 also has an outer race 51 and rollers 52 positioned between the races 48 and 51. For supporting or engaging the outer race 51 the cover 28 is provided with a cylindrical and concentric depending wall or sleeve 54 which projects downwardly, and the lower end thereof surrounds the race 51. Positioned in an annular chamber 55 which is formed around the spindle 14 within the annular wall 54 and below the sealing means 12 is a yieldable or resilient pressure applying means of my invention which is designated in general by the numeral 57. This pressure applying means includes a rubber body in the form of a rubber ring 58 which is enclosed by a retainer member 59. This member 59 is annular in shape and has an outwardly extending or radially extending flange 61 and a cylindrical flange 62. The radial flange has a shoulder 63 which engages the upper face of the outer race 51 of the bearing 47. The retainer 58 cooperates with the adjacent portions of the cover to provide the annular chamber in which the resilient body 58 is positioned. The body 58 is somewhat longer than the cylindrical wall, and the upper end 64 of the cylindrical wall 57 does not engage the cover 28 or the sealing member 29.

When the cover 28 is installed, as illustrated, the body of rubber 59 is compressed as shown and tends to bulge inwardly through the space 65 provided above the end wall 64. This applies a pressure downwardly against the retainer 59 to the outer race 51, through the bearing parts to the spindle 14, and from the spindle to the thrust bearing 19. This pressure is resiliently or yieldably applied due to the fact that the body of rubber 58 is of such a character. It should be understood, however, that I do not wish my invention to be limited to the particular resilient or yieldable force applying means but intend that my invention cover equivalents, such, for example, as a coil spring or a plurality of coil springs under compression.

In assembling the rotary swivel of my invention, the parts are assembled substantially as shown except that the bolts 67 employed to secure the cover 28 to the body 11 are not secured in place or are not secured tightly in place. At this time the cover may occupy a position indicated by dotted lines 68 in Fig. 3, and the body of rubber 58 is at this time not compressed, as shown, but extends upwardly as indicated by dotted lines 69. In assembling the thrust bearing 19 it is necessary that the bearing races be placed concentrically with respect to the axis of rotation of the spindle 14. The upper race 22, being non-adjustably mounted on the spindle 14, initially occupies a concentric position. The lower race 20, however, merely rests on the shoulder 18 and is not centralized by engagement with any cylindrical walls. This is a preferred construction in view of the fact that it is not practical to machine the shoulder with the accuracy required for exactly concentrically mounting the lower race 20. The lower race 20 therefore is positioned on the shoulder 18 and is centralized not with respect to any parts of the body 11 but with respect to the axis of rotation of the spindle 14. This is done before the parts are moved into their final assembled position, and after alignment has been obtained the spindle may be rotated to determine that the parts are in proper operating position. When this has been accomplished the bolts 67 are then tightened, with the result that the cover 28 is moved from the position shown by dotted lines 68 in Fig. 3 into full line position. This compresses the body of rubber 58 and causes it to assume the position shown by full lines in Fig. 3, and applies a pressure of substantially three thousand pounds downwardly through the spindle and to the thrust bearing parts 19. It will be seen that not only is the thrust bearing 19 placed under this initial load but that the radial bearing 47 is also placed under an initial load. The load placed on the thrust bearing is sufficient to securely hold the lower race 20 of the thrust bearing 19 in the exact concentric position to which it has been adjusted. This force is sufficient so that during the shipping of the apparatus, even though it is roughly handled, the parts will still maintain their concentric position, and also when in use the parts will maintain their concentric position so that there will be no misalignment of any of the thrust bearing parts and so that there will not be imposed on the spindle any forces tending to misalign the spindle and thus place undue wear on other parts thereof.

It will be seen that the main bearing or thrust bearing at all times operates under a predetermined minimum load, and it has been found that by such an arrangement better service is obtained.

It will also be seen that should any parts expand or contract due to change of temperature that these are readily compensated for by the yieldable body 58.

My invention eliminates any disadvantages which are present in prior art constructions due to inaccuracy of machining any of the end faces in the rotary swivel. The result of any inaccuracies in my invention merely affects the amount that the body of rubber 58 is compressed. In other words, the body of rubber 58 constitutes a resilient or yieldable compensating means which compensates for any inaccuracies in machine work on any of the end faces of any of the parts.

In the form of my invention illustrated in Fig. 4 the parts are identical and have been given identical numerals with the exception of the hold-down bearing which I designate by the numeral 70 which is of a different type from the hold-down bearing 47 shown in Figs. 1 to 3 inclusive. This hold-down bearing 70 has a lower race 71 which engages the shoulder 50, which shoulder 50 incidentally is made wider in order to receive this lower race. The bearing 70 also has an upper race 72 which engages the radial flange 61 of the retainer 59. Positioned between the races 71 and 72 are ball bearings 73.

In this form of my invention the operation is identical to that described in Figs. 1 to 3 inclusive.

Fig. 5 is a fragmentary sectional view illustrating still another form of my invention. In this form of my invention the bearing 47 is placed in the extreme upper end of the annular chamber 55 provided within the annular wall 54, and the outer race 51 is provided with an extension 74 which engages an end wall 75 provided by the cover 28. It will be seen, therefore, that space is provided between the bearing 47 and the shoulder 50. In this form of my invention the resilient pressure applying means 57 is placed in this space. The retainer 59 surrounds and is placed on the spindle 14, and the cylindrical wall 62 extends downwardly toward the shoulder 50. The body of rubber 58 is compressed between the radial flange 61 of the retainer 59 and the shoulder 58 as shown. In this form of my invention the radial bearing 47 does not move vertically as in the form of my invention illustrated in Fig. 1 due to the fact that the compensating means is placed between the shoulder 50 and the inner race 48 of this bearing. The mode of operation in this form of my invention is identical to that of the form of my invention shown in Figs. 1 to 3 inclusive.

In the form of my invention illustrated in Fig. 6 the construction is identical to that shown in Fig. 1 except that the resilient or yieldable pressure applying means is not placed above the bearing 47, but the bearing 47 is in direct engagement with the end wall 75. The spindle and bearing therefore are not longitudinally adjustable relative to the cover 28. The resilient or yieldable pressure applying means in this form of my invention is provided in the form of an annular body of rubber 80 which is positioned in an annular channel 81 positioned below the race 20 of the thrust bearing 19. Before pressure is applied the body of rubber 80 projects upwardly from the channel 81, as illustrated by dotted lines 82, and the lower race is supported in a position indicated by dotted lines 83. All of the parts supported by the thrust bearing are in turn in a raised position, and the cover 28 will likewise be in a raised position, as shown by dotted lines 68 in Fig. 3. When the cover is applied all of the parts between the cover and the thrust bearing 19 are gradually forced downwardly and the body of rubber 80 is compressed in the annular channel 81. In this way the thrust bearing, as well as the radial bearing 47, is placed, and is thus preloaded.

It is believed that from the foregoing description those skilled in the art will readily understand my invention and that the principle thereof may be embodied in different constructions. I believe my invention to be broadly new and, as stated heretofore, desire it to be broadly construed in accordance with the appended claims.

I claim as my invention:

1. In a rotary swivel of the character described, the combination of: a swivel body having an opening at the top thereof, a side wall, and a bottom wall provided with an opening of smaller diameter than said top opening, there being a thrust bearing receiving face on said bottom wall; a thrust bearing carried on said face; a spindle extending through said body and having a collar thereon provided with a downwardly directed face for engaging said thrust bearing, there being an upwardly directed shoulder on said spindle above said collar; a combined radial thrust bearing on said spindle in a position to rest on said shoulder; a cap for closing said top opening of said body, said cap having a bore surrounding said radial thrust bearing and a shoulder in said bore above said radial thrust bearing; screw means for securing said cap on said body; and a resilient means in the upper part of said body between said shoulder of said bore and said radial thrust bearing to apply a downward force to said radial thrust bearing and thereby apply a constant load to said thrust bearing when said screw means is tightened.

2. In a rotary swivel of the character described, the combination of: a swivel body having an opening at the top thereof, a side wall, and a bottom wall provided with an opening of smaller diameter than said top opening, there being a thrust bearing receiving face on said bottom wall; a thrust bearing carried on said face; a spindle extending through said body and having a collar thereon provided with a downwardly directed face for engaging said thrust bearing, there being an upwardly directed shoulder on said spindle above said collar; a combined radial thrust bearing on said spindle in a position to rest on said shoulder; a cap for closing said top opening of said body, said cap having a bore surrounding said radial thrust bearing and a shoulder in said bore above said radial thrust bearing; screw means for securing said cap on said body; a resilient means in the upper part of said body between said shoulder of said bore and said radial thrust bearing to apply a downward force to said radial thrust bearing and thereby apply a constant load to said thrust bearing when said screw means is tightened; a pair of sealing members disposed between said spindle and said cap above said resilient means, said sealing members being spaced apart so as to leave an annular space therebetween; and means for feeding lubricant into said annular space between said spaced sealing members.

3. In a rotary swivel of the character described, the combination of: a swivel body having an opening at the top thereof, a side wall, and a bottom wall provided with an opening of smaller diameter than said top opening, there being a thrust bearing receiving face on said bottom wall; a conical roller type thrust bearing carried on said face, said face being of larger diameter than the part of said thrust bearing engaging the same so that said thrust bearing may be radially adjusted on said face; a spindle extending through said body and having a collar thereon provided with a downwardly directed face for engaging said thrust bearing, there being an upwardly directed shoulder on said spindle above said collar; a combined radial thrust bearing on said spindle in a position to rest on said shoulder; a cap for closing said top opening of said body, said cap having a bore surrounding said radial thrust bearing and a shoulder in said bore above said radial thrust bearing; screw means for securing said cap on said body; and a resilient means in the upper part of said body between said shoulder of said bore and said radial thrust bearing, operative when said screw means for said cap is tightened, to apply through said radial thrust bearing a load on said conical roller type bearing of sufficient magnitude to hold the same firmly against said face of said body.

4. In a rotary swivel of the character described, the combination of: a swivel body having an opening at the top thereof, a side wall, and a bottom wall provided with an opening of smaller diameter than said top opening, there being a bearing support in the lower part of said swivel body; a spindle extending through said swivel body, said spindle having a downwardly faced thrust bearing abutment spaced from said bearing support; a cap for closing the top opening of said body, said cap having an axial opening through which said spindle passes; a thrust bearing positioned between said bearing support and said bearing abutment; radial bearing means above and below said thrust bearing to axially align said spindle; and means carried by said cap to apply a continuous minimum working load to said spindle to be imposed on said thrust bearing, said load applying means comprising a member of resilient material placed so as to transmit said working load and to be deformed thereby.

DAVID M. SMITH.